United States Patent [19]

Ohmi et al.

[11] 4,445,425
[45] May 1, 1984

[54] HOUSING SHELLS OF FLUID PRESSURE MOTORS

[75] Inventors: Atsushi Ohmi, Anjo; Chiaki Ochiai, Chiryu, both of Japan

[73] Assignee: Aisin Seiki Kabushiki Kaisha, Kariya, Japan

[21] Appl. No.: 283,547

[22] Filed: Jul. 15, 1981

[30] Foreign Application Priority Data

Jul. 29, 1980 [JP] Japan .................. 55-107790[U]

[51] Int. Cl.³ .................... F01B 19/02; F16J 3/02
[52] U.S. Cl. .................... 92/98 D; 92/169; 220/298
[58] Field of Search .......... 92/98 R, 98 D, 99, 169; 220/298, 301, 302

[56] References Cited

U.S. PATENT DOCUMENTS

| | | | |
|---|---|---|---|
| 2,488,526 | 11/1949 | Crawford | 220/301 |
| 2,969,046 | 1/1961 | Kellogg et al. | |
| 3,057,332 | 10/1962 | Kellogg et al. | 92/98 D |
| 3,083,698 | 4/1963 | Price et al. | |
| 3,146,682 | 9/1964 | Price et al. | |
| 4,296,680 | 10/1981 | Ohta et al. | 92/98 D |
| 4,348,944 | 9/1982 | Ochiai | 92/99 |

FOREIGN PATENT DOCUMENTS 945287 12/1963 United Kingdom .
1011733 12/1965 United Kingdom .

Primary Examiner—Robert E. Garrett
Assistant Examiner—Richard S. Meyer
Attorney, Agent, or Firm—Oblon, Fisher, Spivak, McClelland & Maier

[57] ABSTRACT

A fluid pressure servomotor for automotive vehicle brakes embodying a housing provided by assembling two shells, a pressure responsive power wall in the housing, a valve mechanism associated with the power wall and being movable relative thereto to control the differential pressure across the power wall, an actuating member connecting the pedal for manually moving the valve mechanism, and an output member for connecting the power wall to a brake master piston. The shells are assembled by being locked together and can be disassembled and reassembled due to the provision of a mechanism for resiliently restoring a yieldable portion in a locking structure so that the shells are reassembled by a uniting axial movement and a subsequent rotative movement to lock the shells with each other in position against such resiliency.

5 Claims, 4 Drawing Figures

HOUSING SHELLS OF FLUID PRESSURE MOTORS

BACKGROUND OF THE INVENTION

1. Field of the Invention

This invention relates to a new and improved construction for a fluid braking booster and more particularly to a locking structure for a shell and an end cover which provides the casing or housing for the fluid pressure servomotors.

2. Description of the Prior Art

It has been proposed in the art to compress an outer periphery bead of a diaphragm in a radially outwardly opened channel on the outer periphery of an end cover by the internal surface of a shell for attaining a minimum external diameter yet providing a maximum uniform cross section of the shell for decreasing the necessary minimum space of the servomotor when installed in the vehicle body.

Several types of fluid pressure motors have been developed. These fluid pressure motors have been generally successful and highly efficient in attaining a small volume of the motors, but they usually are of such type that they attain the foregoing by provision of no reassembling ability during their service life.

SUMMARY OF THE INVENTION

It is a principal object of the present invention to provide an improved fluid pressure servomotor having a mechanism to enable disassembling and reassembling during its service life for repair or inspection purposes.

The foregoing object and others are attained according to at least one aspect by the provision of a mechanism for resiliently restoring a yieldable portion in a lock structure so that the shell and the end cover are reassembled by a uniting axial movement in relation to each other upon coaxial alignment and a subsequent rotative movement to lock the shell and the end cover in position against such resiliency.

Therefore the invention includes a stamped open ended sheet metal shell forming an axially extending internal chamber of uniform cross section adjacent its open end, a radially outwardly bent shoulder around the external periphery of the shell and spaced a distance from the open end of the shell, the shell having formed therein slots at generally regular intervals around the periphery of the shell a predetermined distance axially outwardly of the shoulder such that a plurality of radially inwardly extending portions projecting radially inward from the shell are formed between the slots and its open end, and end cover having a radially outwardly opened channel on the outer periphery of the end cover and slidably fitted with respect to the inside of the section between the shoulder and the open end of the shell, the periphery of the end cover having a plurality of notches formed therein at regular intervals capable of receiving the plurality of radially inwardly extending portions, and a movable wall in the chamber having a diaphragm portion with an outer peripheral bead of the diaphragm compressed into the channel on the end cover in cooperation with the shell to provide a fluid seal. The invention further includes at least one dented portion in the shoulder of the shell facing at least one of said plurality of radially inwardly extending portions and first and second spaced tabs extending from the peripheral edge of the end cover and located between first and second adjacent notches of said plurality of notches and facing in opposite circumferential directions with respect to the radially inwardly extending portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
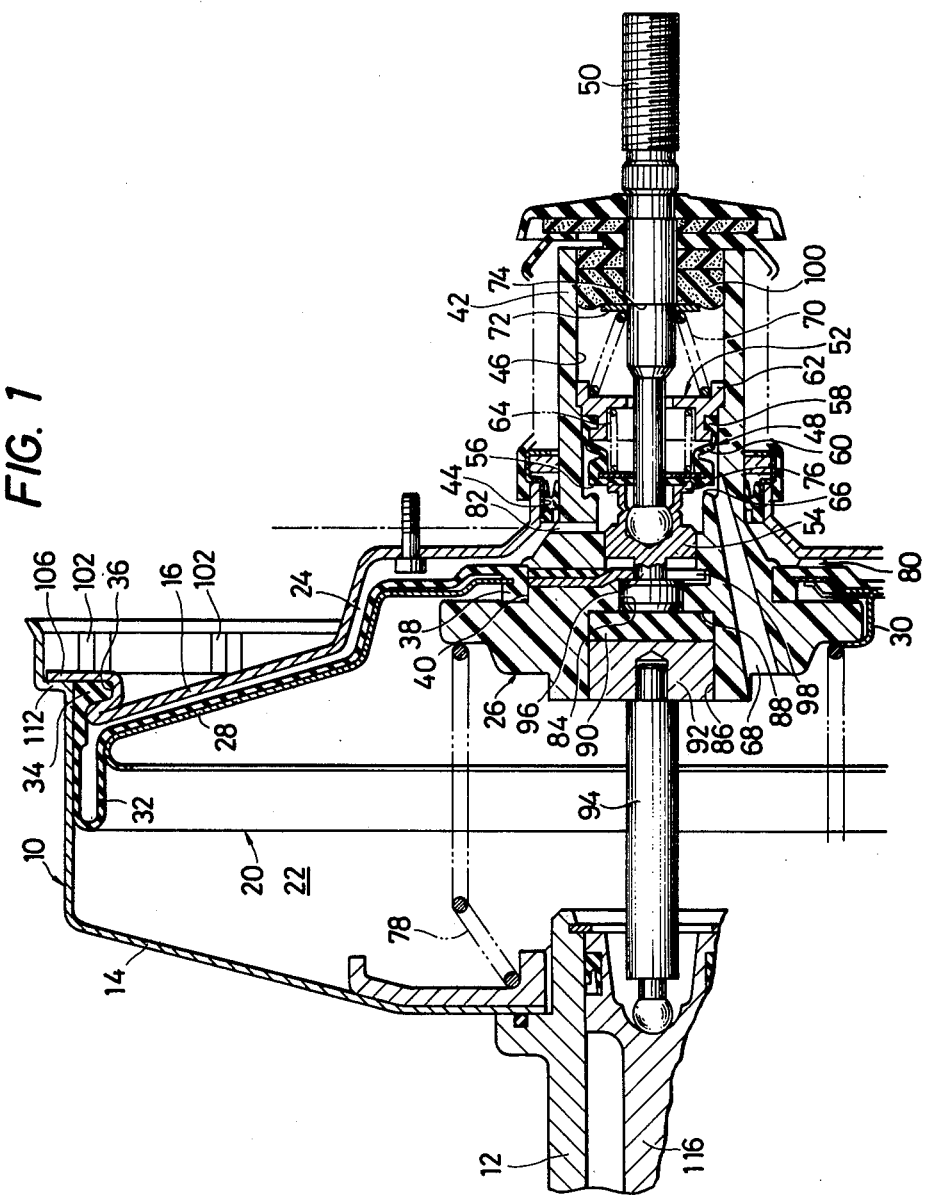
FIG. 1 is a cross sectional view of a fluid pressure servomotor embodying principles of the present invention.

The servomotor 10 has a first housing shell 14 held fast to a second housing shell or end cover plate 16 as will later be described in detail. A movable wall 20 is located within the first shell 14 and the end cover 16 to form a first variable volume chamber 22 and a second variable volume chamber 24. The movable wall 20 comprises a central hub 26 with a diaphragm backing plate 28 held thereon by fingers 30 (only one being shown in the view) overlying the front face of the central hub 26. A diaphragm 32 has a first bead 34 on its periphery which is compressed in an outwardly radially opened channel 36 of the end cover 16 to provide a fluid seal on the outer periphery of the diaphragm 32, and a second bead 38 which is snapped into a groove 40 adjacent the backing plate 28 and which holds the inner edge of the backing plate 28 which lies behind the central hub 26.

The hub 26 has a rearwardly extending projection 42 which extends through an opening 44 in the cover 16. The projection 42 has an axial bore 46 in which a control valve mechanism 48 is located for supplying an operational input from a pedal (not shown) through a push rod 50.

The control valve mechanism 48 comprises a valve assembly 52 which is operated upon forward movement of a plunger 54 by the push rod 50 first to interrupt vacuum and then to develop a pressure differential across the movable wall 20.

The valve assembly 52 has a face 56 separated from a fixed bead 58 by a flexible section 60. The bead 58 is retained within the bore 46 by a retainer 62. A first spring 64 connected to the retainer 62 urges the face 56 toward a first valve seat 66 adjacent a vacuum passage 68. The first valve seat 66 will be referred to herein as the vacuum seat 66. The vacuum passage 68 connects the first chamber 22 with the interior of the bore 46 of the hub 26. A second spring 70, located between the retainer 62 and a ring 72 abutting a shoulder 74 of the push rod 50, urges a second valve seat 76 on the plunger 54 into contact with face 56. The second valve seat 76 will be referred to herein as the air seat.

A return spring 78 located between the shell 14 and the hub 26 urges the diaphragm 32 to the right towards the cover 16, until a buffer portion 80 of the diaphragm 32 abuts the cover 16. In this position, a vacuum communicated from the intake manifold (not shown) through a conduit (not shown) past a check seat (not shown) to the front chamber 22 will evacuate air from the second variable chamber 24 by way of a radial passage 82, the bore 46 and the vacuum passage 68. This defines the rest position of the movable wall 20.

The left forward end of the plunger 54 extends into an opening 84 which communicates with a reaction chamber 86. The reaction chamber 86 is formed by a stepped bore and has an annular shoulder 88. Within the stepped reaction chamber 86 are positioned a rubber-like material 90 and a head 92 of a driven member 94. The driven member 94 is mechanically linked to a master piston 116 of a brake master cylinder 12.

The plunger 54 is formed with a reduced diameter portion 96 which is movably straddled by a bifurcated stem of a key 98. The key 98 is fast fit in a corresponding radial bore in the wall of the hub 26 as shown to provide a stop means for the plunger 54 in the position shown by abutting engagement with one end shoulder of the diametrically reduced portion 96 of the plunger 54.

The assembly operates as follows. In the position shown, every part of the braking servomotor 10 occupies its rest position. It should be noted that in this position there is a small clearance between the vacuum seat 66 and face 56, while the air seat 76 engages the face 56 of the valve assembly 52 so that the chamber 24 is in communication with the other chamber 22 and both are at subatmospheric pressure. Air at atmospheric pressure is present in the bore 46 through a filter 100, but is isolated from both chambers.

When an operator applies an input force to a brake pedal (not shown), the push rod 50 will move to allow the first spring 64 to move the face 56 of the valve assembly 52 against the vacuum seat 66 to interrupt communication between the first chamber 22 and the bore 46 through the vacuum passage 68. The clearance is calculated so as to be minimal while maintaining communication between the first chamber 22 and the bore 46 in the rest position. Further movement of the push rod 50 will move the air seat 76 away from the face 56 to allow air at atmospheric pressure, present in the bore 46, to enter the rear chamber 24 through the radial passage 82. With air in the rear chamber 24 and a vacuum in the front chamber 22, a pressure differential exists across the movable wall 20. This pressure differential will create an operational force which will be transmitted through the central hub 26 to move the head 92 of the driven member 94 through the rubber-like material 90, so that braking fluid pressure is developed in the brake master cylinder 12 in a conventional manner.

In this operation, a major part of the reactional force developed in the rubber-like material 90 is received by the shoulder 88 of the central hub 26 of the movable wall 20 while the remainder is received by the plunger 54 and in turn by the push rod 50 to be sensed by the operator through the braking pedal (not shown).

As thus far described, the construction and operation of the servomotor 10 is conventional. The inventive features are described hereinbelow with reference to FIGS. 2 to 4.

Figure 2:
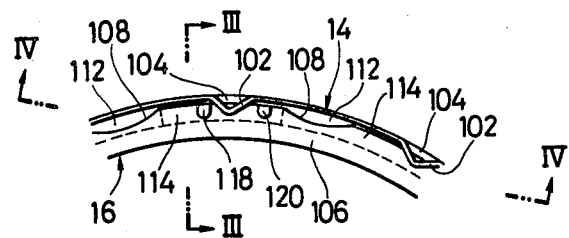
FIG. 2 is an enlarged fragmentary view of the locking structure used to fasten the shell and the cover of the housing.
Figure 3:
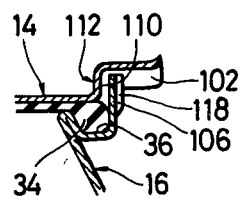
FIG. 3 is a cross sectional view taken along line III—III in FIG. 2.

According to principles of the present invention, the servomotor structure shown in the drawings is made so that it can be assembled quickly, and so that the first and second shells 14 and 16 can be locked together by a novel interlocking structure which is formed as part of the sheet metal parts themselves. The shell 14 is stamped from a piece of sheet metal into a generally cup shaped structure having an outwardly radially bent shoulder 112, and has formed therein a plurality of slots 104 circumferentially at regular intervals a slight distance rearwardly from the shoulder 112, as shown in FIG. 2. A plurality of radially inwardly extending portions 102 projecting radially inward from the shell 14 are formed between the slots 104 and the open end of the shell 14 to provide a locking structure as best seen in FIGS. 2 and 3 of the drawings. It should be noted that each of the radially inwardly extending portions 102 is preferably formed after the cover 16 is placed into the shell 14 during initial assembling. The shell or cover 16 of the housing is also stamped from a piece of sheet metal and is provided with a radially turned flanged section 106 and the radially outwardly opened channel 36. The first bead 34 of the diaphragm 32 disposed in channel 36 acts in cooperation with the wall of the shell 14 to provide a fluid seal. The flange 106 is provided with a predetermined clearance with respect to the internal side wall of the shell 14. The flange 106 of the cover 16 has a plurality of notches 108 formed therein at substantially regular intervals so as to match the radially inwardly extending portions 102 of the first shell 14 so that the cover 16 can be inserted into the open end of the shell 14 with the radially inwardly extending portions 102 axially passing through the notches 108 of the cover 16.

As best shown in FIG. 1, the shell 14 is bent or stepped radially outwardly to provide the shoulder 112 against which the edge of the flanged section 106 is positioned so as to permit a plurality of full diameter portions 114 of flange 106 to be clamped and tightened firmly between the radially inwardly extending portions 102 and the shoulder 112 to lock the cover 16 to the shell 14.

Figure 4:
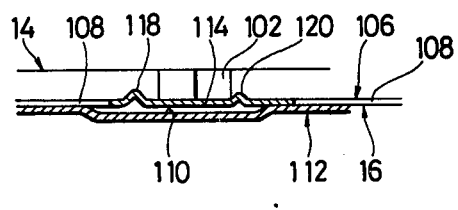
FIG. 4 is a cross sectional view taken along line IV—IV in FIG. 2.

The shoulder 112 is formed with at least one dented portion 110 as best shown in FIG. 4 which permits the flange 106 to be resiliently deformed when the cover 16 is rotatively moved relative to the shell 14 with either first or second tabs 118, 120 passing behind the radially inwardly extending portion 102 as described hereinbelow in greater detail.

It is intended that the movable structure 20 with its associated parts will be assembled before placing into the shell 14, and that the cover 16 will be forced into the open end of the shell 14 to compress the first bead 34 of the diaphragm 32 into sealing engagement between the inner side wall of the shell 14, and the channel 36 and the flange 106 of the cover 16. In order that the flange 106 will be prevented from being rotated clockwise beyond the point where its full diameter sections 114 are centered behind the radially inwardly extending portions 102, a tab 118 is bent axially rearwardly from one of the full diameter portions 114 of the flange 106 so that it abuts the inner surface of one of the radially inwardly extending portions 102 and prevents further rotation of the cover 16.

It is further contemplated that the cover 16 can also be locked against rotation in a counterclockwise direction by means of a second tab 120 shown in FIGS. 4 and 2 which faces in the opposite circumferential direction with respect to tab 118 with one of the plurality of radially inwardly extending portions 102 disposed therebetween. The tab 120 must be bent a suitable amount outwardly of the face of the flange 106 so as to prevent rotation of the cover 16 in the counterclockwise direction away from its locked position due to abutment against the radially inwardly extending portion 102, yet providing for its clockwise rotation into the locked positon by the radially inwardly extending portion 102 resiliently deforming the full diameter portion 114 of flange 106 into dented portion 110. It will be noted that the tab 120 provides a mechanism similar to a cam when the cover 16 is rotated in the clockwise direction into its locking position with the tab 120 passing through the radially inwardly extending portion 102. Capability of such clockwise rotation may be attributed to the provision of the dented portion 110 in the shoulder 112.

In order to prevent rotation of cover 16 with respect to shell 14, the tab 118 is calculated as having a sufficient height to completely prevent the cover 16 from rotation beyond the radially inwardly extending portion 102. However, the height may be identical with that of the second tab 120 with the advantage that no conscious effort is needed since rotation in either direction can introduce the cover 16 into its locking position. In this case, the length of the dented portion 110 must be so calculated as to be sufficient to permit the full diameter portion 114 on which both the tabs 118 and 120 are located to be resiliently deformed when the tabs 118, 120 are passing past the radially inwardly extending portion 102.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid pressure servomotor comprising:
   a stamped open ended sheet metal shell forming an axially extending internal chamber of uniform cross section adjacent said open end;
   a radially outwardly bent shoulder around the external periphery of said shell and spaced a distance from said open end thereof, said shell having a plurality of slots formed therein at generally regular intervals around the periphery of said shell a predetermined distance axially outwardly of said shoulder;
   a plurality of radially inwardly extending portions projecting radially inward from said shell between said slots and said open end of said shell;
   an end cover having a radially outwardly opened channel formed on the outer periphery thereof and a flanged edge slidingly fitted with respect to an inside portion of a section of the shell located between said shoulder and said open end of said shell, said periphery of said end cover having a plurality of notches formed therein at regular intervals corresonding to said inwardly extending portions of said shell for receiving said inwardly extending portions;
   a movable wall disposed in said chamber and having a diaphragm portion, an outer peripheral bead of said diaphragm compressed into said channel on said end cover in cooperation with said shell to thereby provide a fluid seal;
   said shoulder of said shell including at least one dented portion facing one of said plurality of radially inwardly extending portions; and
   at least first and second tabs extending from the peripheral edge of said flanged edge of said end cover and facing in opposite circumferential directions with respect to said radially inwardly extending portion such that upon rotation of said end cover with respect to said shell during assembling, disassembling or reassembling said peripheral edge of said flanged edge cooperates with at least one of said plurality of radially inwardly extending portions to resiliently deform into said at least one dented portion so that said at least one tab will slidably pass at least one of said plurality of radially inwardly extending portions.

2. A fluid pressure servomotor according to claim 1 wherein said first and second tabs are located together between first and second notches of said plurality of notches on said peripheral edge of said end cover and separated by a distance sufficient to interpose one of said plurality of radially inwardly extending portions therebetween.

3. A fluid pressure servomotor according to claim 1 wherein said first tab is located between first and second notches of said plurality of notches and said second tab is located between said second notch and a third notch of said plurality of notches, said first and second tabs facing in different circumferential directions with respect to said radially inwardly extending portions adjacent each of said tabs so that said end cover is locked against rotation with respect to said shell.

4. A fluid pressure servomotor according to claim 1 wherein said at least one dented portion is of a predetermined length such that said peripheral edge of said flanged edge is resiliently deformed into said at least one dented portion when at least one of said first and second tabs is rotated past at least one of said radially inwardly extending portions when said end cover is rotated with respect to said shell to a locked position.

5. A fluid pressure servomotor according to claim 1 wherein said at least one dented portion further comprises a plurality of dented portions, each of said plurality of said dented portions being substantially dimensionally equivalent and positioned such that each of said plurality of said dented portions cooperates with each of said plurality of radially inwardly extending notches, respectively.

* * * * *